(12) United States Patent
Takakusagi et al.

(10) Patent No.: US 7,261,191 B2
(45) Date of Patent: Aug. 28, 2007

(54) ROTATING BRAKE MEMBER OF BRAKING DEVICE FOR VEHICLE

(75) Inventors: Minoru Takakusagi, Gunma (JP); Hiroshi Uehara, Tochigi (JP); Atsushi Sutou, Gunma (JP); Sadahiko Sakamoto, Tochigi (JP); Hiroshi Fujii, Tokyo (JP); Hiroaki Konse, Tokyo (JP)

(73) Assignees: Kiriu Corporation, Kiryu-shi (JP); Nippon Paint Co., Ltd., Osaka-shi (JP)

( * ) Notice: Subject to any disclaimer, the term of this patent is extended or adjusted under 35 U.S.C. 154(b) by 0 days.

(21) Appl. No.: 10/258,875

(22) PCT Filed: Feb. 20, 2002

(86) PCT No.: PCT/JP02/01462

§ 371 (c)(1),
(2), (4) Date: Oct. 30, 2002

(87) PCT Pub. No.: WO02/068840

PCT Pub. Date: Sep. 6, 2002

(65) Prior Publication Data

US 2003/0089563 A1 May 15, 2003

(30) Foreign Application Priority Data

Feb. 23, 2001 (JP) .............................. 2001-047834

(51) Int. Cl.
*F16D 65/12* (2006.01)

(52) U.S. Cl. .......................... 188/218 XL; 188/218 R; 524/406

(58) Field of Classification Search ......... 188/218 XL, 188/218 R; 428/418; 524/406; 427/386; 106/14.05, 14.11, 14.12, 14.21
See application file for complete search history.

(56) References Cited

U.S. PATENT DOCUMENTS

| 4,025,692 | A  |   | 5/1977  | Yamagishi et al. |
|-----------|----|---|---------|------------------|
| 4,436,848 | A  | * | 3/1984  | Haines et al. ................ 523/426 |
| 5,482,544 | A  | * | 1/1996  | Okuda et al. ............ 106/14.12 |
| 5,569,543 | A  | * | 10/1996 | Schaffer et al. ............. 428/552 |
| 5,578,669 | A  | * | 11/1996 | Odawa et al. ............. 524/414 |
| 5,618,634 | A  | * | 4/1997  | Hosoda et al. ............. 428/610 |
| 6,071,565 | A  | * | 6/2000  | Chiao ......................... 427/386 |
| 6,554,989 | B2 | * | 4/2003  | Muramoto et al. ......... 204/488 |

FOREIGN PATENT DOCUMENTS

| DE | 197 12 642 A1   | 10/1998 |
| EP | 0 131 685 A2    | 1/1985  |
| EP | 0 930 347 A1    | 7/1999  |
| EP | 0 983 799 A2    | 3/2000  |
| JP | 52-5628         | 1/1977  |
| JP | 64-58372 (1-58372 A | 3/1989 |

(Continued)

*Primary Examiner*—James McClellan
*Assistant Examiner*—Bradley T. King
(74) *Attorney, Agent, or Firm*—Foley & Lardner LLP

(57) ABSTRACT

In a brake disc rotor 1, at least a road wheel mounting plane 6 is covered with a rust preventive coating 8 of rust preventive paint. The rust preventive paint is water-borne acrylic-denatured epoxy resin paint containing aluminum zinc phosphomolybdate as a rust preventive pigment, and is applied in such a manner that the coating 8 attains a thickness t of 1 to 20 μm, preferably 5 to 15 μm.

12 Claims, 4 Drawing Sheets

FOREIGN PATENT DOCUMENTS

| | | |
|---|---|---|
| JP | 2-120202 U | 9/1990 |
| JP | 5-112754 A | 5/1993 |
| JP | 8-259852 A | 10/1996 |
| JP | 2000-230151 A | 8/2000 |
| JP | 2001-49168 A | 2/2001 |

* cited by examiner

ROTATING BRAKE MEMBER OF BRAKING DEVICE FOR VEHICLE

TECHNICAL FIELD

The present invention relates to improvements in a rotary braking member that performs as a braking element of a vehicle brake system, such as a brake drum for use in a drum brake or a brake disc rotor for use in a disc brake. More specifically, the present invention relates to a rust proofing structure of a cast-iron brake drum or brake disc rotor.

BACKGROUND ART

There are previously known rust proofing processes for a cast-iron brake drum or brake disc rotor, especially for a road wheel mounting plane thereof. These rust proofing processes include: (a) the application of rust preventive oil; (b) the combined application of rust preventive oil and paint (by means of a spray gun or dipping); (c) zinc phosphate conversion treatment; and (d) dacrodized treatment.

The process (a) i.e. the application of rust preventive oil only provides low rust preventive performance so that the road wheel mounting plane is prone to rust after mounted in a vehicle, although the rust preventive oil can be applied with simple operation. In the process (b) i.e. the combined application of rust preventive oil and paint, the road wheel mounting plane is made unpainted by means of masking, and the rust preventive oil is applied to the unpainted road wheel mounting plane. It is because that, when the whole of the road wheel mounting plane is covered with a coating of paint in such a manner that the coating has a standard thickness of about 20 to 30 μm, and then, a road wheel is fastened to the road wheel mounting plane by the use of wheel nuts, the wheel nuts tend to work loose owing to the coating thickness. However, the process (b) includes some additional process steps, such as masking, and produces paint waste. Moreover, the road wheel mounting plane is prone to rust even in the process (b) for the same reason as in the process (a).

The process (c) i.e. the zinc phosphate conversion treatment can be performed as disclosed in Japanese Patent Publication No. 1-58372. Much rust preventive performance is not expected in the process (c), as the zinc phosphate conversion treatment is originally intended for surface preparation prior to paint application. The process (d) i.e. the dacrodized treatment includes a larger number of process steps than paint application, thereby resulting in high overall cost for rust prevention. Further, much consideration must be given to the environment because of chrome used in the dacrodized treatment.

DISCLOSURE OF THE INVENTION

In order to solve the above-mentioned problems, the present invention has been made to provide a rust proofing structure that can attain necessary and sufficient rust preventive performance for a road wheel mounting plane without not only causing secondary problems, such as the loosening of wheel nuts and consideration to the environment, but also necessitating the road wheel mounting plane to be given masking.

According to the subject matter of Claim 1, there is provided a rotary braking member, such as a brake drum or a brake disc, having at least a road wheel mounting plane covered with a coating of water-borne acrylic-denatured epoxy resin paint that contains, as a rust preventive pigment, aluminum zinc phosphomolybdate, wherein the coating attains a dry thickness (hereinafter just referred to as a "thickness") of 1 to 20 μm. According to the subject matter of Claim 3, it is clarified that the rotary braking member is a brake disc rotor of a disc brake.

The thickness of the coating is preferably from 5 to 15 μm, as defined by the subject matter of Claim 2, for the following reasons. In the case of applying the paint by e.g. spray coating, the coating needs to be at least about 5 μm in thickness in order to cover the whole of the machined, uneven road wheel mounting plane and, at the same time, maintain an evenness of the coating thickness. When the coating thickness reaches about 20 μm, there arise the possibility that the wheel nuts work loose. The coating thickness is thus preferably adjusted to 15 μm or less, allowing for a margin of safety.

As the water-borne acrylic-denatured epoxy resin paint, there can be typically used "O-DE SHINE KS BLACK KM" available from Nippon Paint Co., Ltd. This paint is characterized as being nonpolluting, quick-dry and suitable for painting a specific area without masking as well as exhibiting excellent rust preventive performance.

Considering that a conventional rust preventive paint coating has a thickness of about 20 to 30 μm, the coating of the present invention is categorized as a thin coating according to its thickness of 1 to 20 μm, preferably 5 to 15 μm. In order for such a thin coating to attain necessary and sufficient corrosion resistance and heat resistance, there are used various techniques for designing a base resin of the paint: e.g. to enhance the adherence of the paint to a protuberance, thereby attaining an evenness of the coating thickness even when the paint area is uneven; to increase the molecular weight of epoxy resin; and to lessen the viscosity of the paint.

In short, at least the road wheel mounting plane is covered with the coating of water-borne acrylic-denatured epoxy resin paint containing, as a rust preventive pigment, aluminum zinc phosphomolybdate so that the coating attains a thickness of 1 to 20 μm, preferably 5 to 15 μm, in the rotary braking member e.g. a brake drum or a brake disc rotor according to the subject matters of Claims 1 to 3. This makes it possible to attain sufficient rust preventive performance required for the road wheel mounting plane of the brake drum or drake disc, without causing the wheel nuts to work loose and producing any adverse effect on substantial braking function of the brake. This makes it also possible to provide, by means of the above thin paint coating alone, a comparable corrosion proofing effect to that of a conventional coating formed by a combination use of zinc phosphate conversion treatment and paint application, because of excellent corrosion resistance of the paint.

In the paint application of the present invention, masking for non-paint areas is not needed. It is thus possible to enhance yield by reducing waste materials. Further, there is no possibility of the secondary problem for the environment through the pollution-free rust proofing process.

BEST MODE FOR CARRYING OUT THE INVENTION

Figure 1:
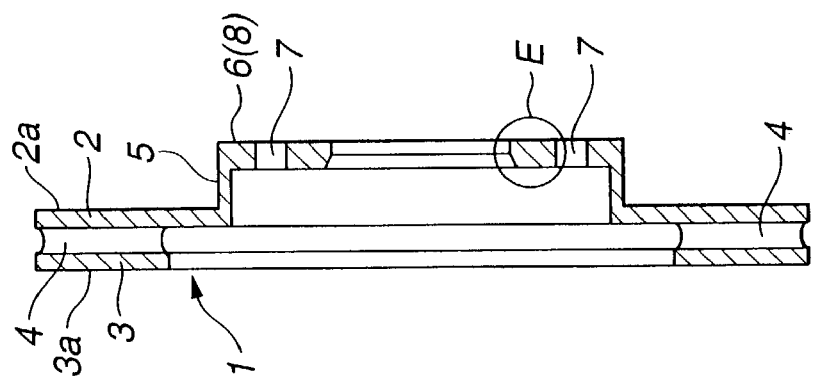
FIG. 1(A) is a front view of a disc brake rotor according to a first embodiment of the present invention.
FIG. 1(B) is a sectional view of the disc brake rotor when taken along a line a-a of FIG. 1(a).
Figure 1:
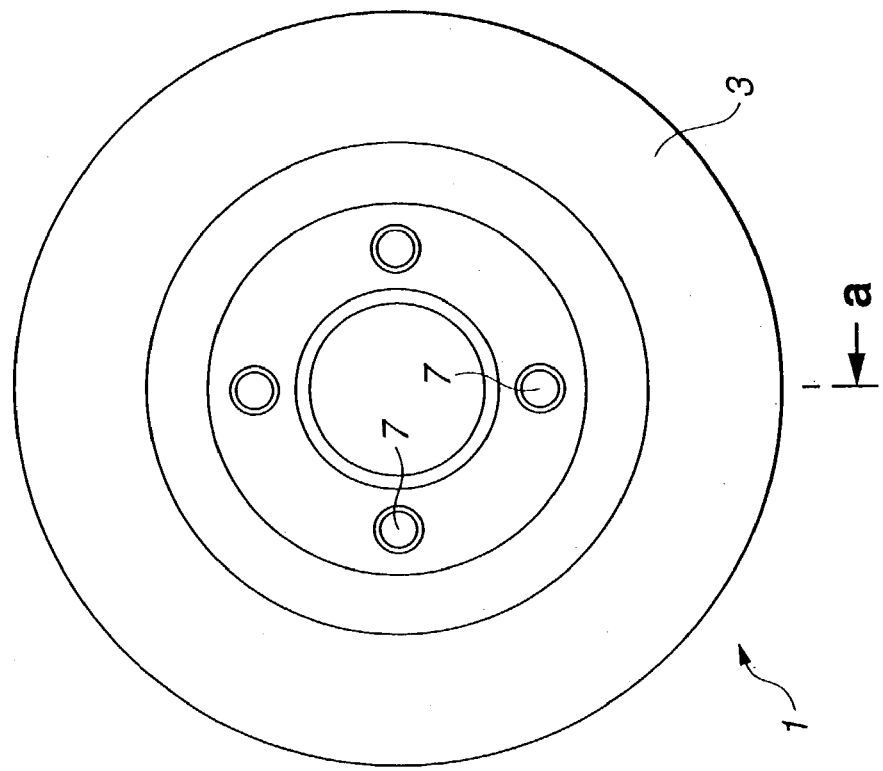

FIG. 1 shows a ventilated type brake disc rotor to which the present invention is applied according to a first preferred embodiment thereof.

The ventilated type brake disc rotor 1 is made of e.g. a common cast-iron material (such as FC250), and has an outer sliding plate 2 to be mounted to a outward position in a vehicle, an inner sliding plate 3 to be mounted to an inward position in the vehicle at a predetermined distance from the sliding plate 2 and a plurality of diaphragms 4 disposed in a radial pattern between the sliding plates 2 and 3, as shown in FIG. 1, so that spaces defined by the sliding plates 2 and 3 and the diaphragms 4 function as ventilation flues. Herein, a reference numeral 5 indicates a cylindrical boss portion formed integrally with the sliding plate 2 so as to have a hat-like sectional profile.

An outermost surface of the boss portion 5 serves as a road wheel mounting plane 6 on which a road wheel is seated. As is well known, hub bolts (not shown) are press fitted in bolt holes 7 of the road wheel mounting plane 6. That is, the road wheel is fastened to the road wheel mounting plane 6 by means of the hub bolts and wheel nuts (not shown) screwed onto the hub bolts.

Figure 2:
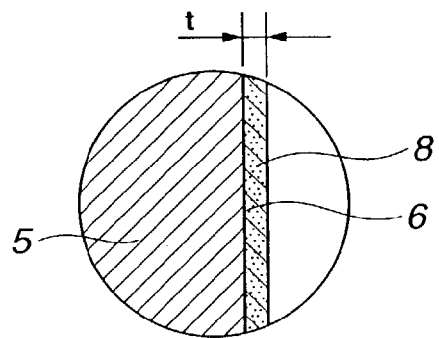
FIG. 2 is an enlarged view of an area E shown in FIG. 1(B).

Further, the whole of the road wheel mounting plane 6 is covered with a rust preventive coating 8 of rust preventive paint. In the application of the rust preventive paint to the road wheel mounting plane 6, it is necessary to achieve necessary and sufficient rust preventive performance while keeping a thickness t of the rust preventive coating 8 as small as possible so that the wheel nuts do not work loose owing to the coating thickness after tightened. For example, the sliding plates 2 and 3 except for cylindrical outer edges thereof, i.e. the road wheel mounting plane 6, a cylindrical outer surface of the boss portion 5 and the sliding surfaces 2a and 3a are subjected to cutting after formed by casting. After the cutting, the rust preventive coatings 8 are thinly formed on the outer and inner sliding plates 2 and 3 except for the sliding surfaces 2a and 3a, i.e., on the road wheel mounting plane 6, the cylindrical outer surface of the boss portion 5 and the cylindrical outside edges of the sliding plates 2 and 3 by spray coating with the use of water-borne acrylic-denatured epoxy resin paint that contains aluminum zinc phosphomolybdate as a rust preventive pigment, as shown in FIG. 2, in such a manner that the coating 8 has a thickness of 1 to 20 μm, preferably 5 to 15 μm. There may be used "O-DE SHINE KS BLACK KM" available from Nippon Paint Co., Ltd. as the water-borne acrylic-denatured epoxy resin paint.

In the application of the above rust preventive paint by spray coating, a painting robot may be used. The painting robot is taught, in advance, the orientation and track that a spray gun is to take against each paint area of the brake disc rotor 1. Then, the robot executes painting by moving the spray gun according to the teaching under the on-off control of paint supply while the brake disc rotor 1 is rotated on its axis. Herein, some part of the sliding surface 2a near the boss portion 5 may be painted, although the sliding surfaces 2a and 3a should not be in principle painted.

The road wheel mounting plane 6 requires strict control over its coating thickness. However, the cylindrical outer surface of the boss portion 5 and the cylindrical outer edges of the sliding plates 2 and 3 may allow a relatively larger coating thickness so as to insure proper rust preventive performance, as they are free from the problems arising from the coating thickness For example, the water-borne acrylic-denatured epoxy resin paint may be applied so as to have a thickness of 20 to 30 μm in the same manner as a conventional paint coating.

More specifically, the turning-machined brake disc rotor 1 is washed prior to the paint application. The washing is performed by spraying an alkaline degreasing cleaner on the brake disc rotor 1 with use of a spray gun for 9 seconds or more while rotating the brake disc rotor 1 on its axis at about 100 to 400 rpm. The alkaline degreasing cleaner contains silicate as a main ingredient. As such an alkaline degreasing cleaner, there may be used "PK-4210" (concentration: 3 to 4%) available from Nihon Parkerizing Co., Ltd. with a liquid temperature thereof controlled to about 60 to 75° C.

Then, the cleaner is drained from the brake disc rotor 1. The drainage is conducted by blowing air compressed at about 0.35 MPa onto the brake disc rotor 1 for 8 to 10 seconds such that the cleaner is blew off while rotating the brake disc rotor 1 on its axis at about 800 to 1500 rpm.

In the application of the above water-borne acrylic-denatured epoxy resin paint, a small-sized, low-pressure spray gun with a small-sized nozzle (e.g. having a nozzle size of about 0.5 mm, a paint ejecting amount of about 5 to 60 ml/min, and an atomizing pressure of the spray gun of about 0.05 MPa) is used in order to limit the paint application to specific paint areas without the need to give masking to non-paint areas. The paint areas are successively in a small-spot spray pattern. In order to secure an even coating thickness by sequentially shifting the small-spot spray pattern, it is necessary to appropriately control the orientation, relative position, relative angle and relative speed of the spray gun with respect to each paint area. For example, the relative distance between the spray gun and the paint area is adjusted to about 10 to 30 mm, whereas the moving speed of the spray gun is adjusted to about 16 to 30 mm/sec on the road wheel mounting plane 6 for thin coating and about 1 to 5 mm/sec on the cylindrical outer surface of the boss portion 5 for relatively thick coating. In order to prevent the deposition of a mist of flying paint and to achieve environmental protection, a mist corrector is preferably provided near a painting section of the robot.

Figure 3:
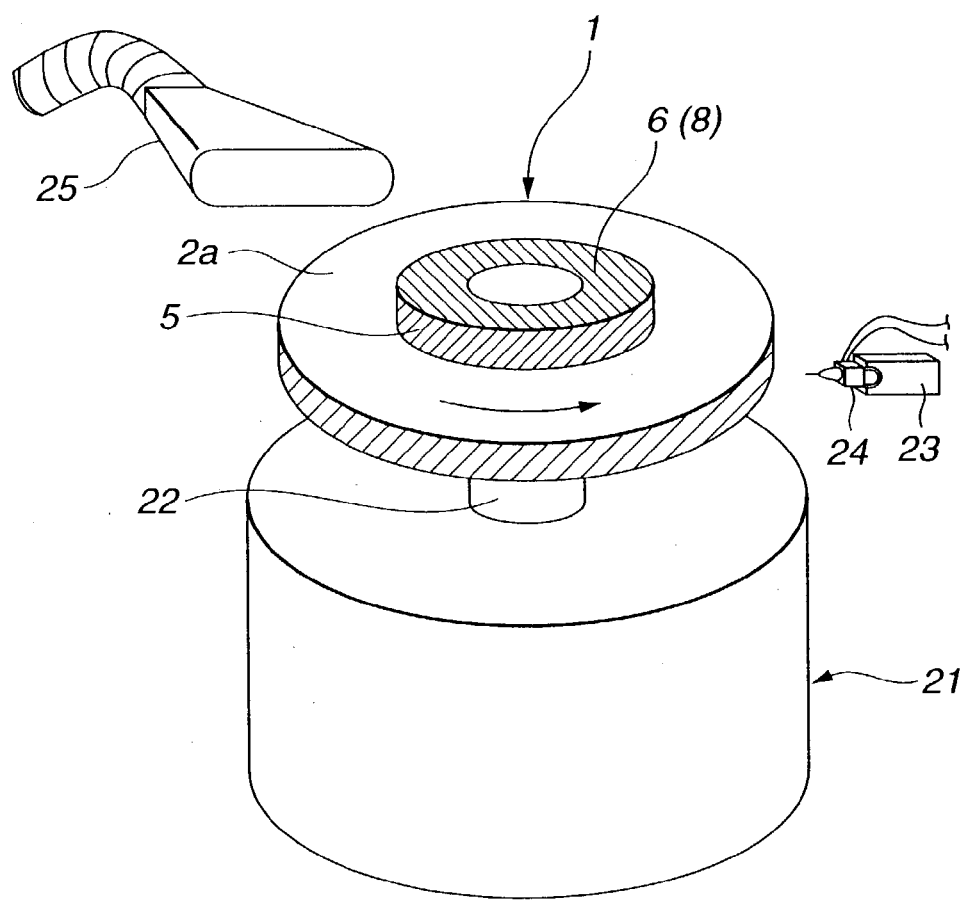
FIG. 3 is a schematic illustration showing one example of practical paint application.

In the first embodiment, the paint areas of the brake disc rotor 1 are in disc or cylindrical shapes. As shown in FIG. 3, the brake disc rotor 1 is thus fixed to a main axis 22 of a rotational drive mechanism 21 and successively painted by moving a small-sized, low-pressure spray gun 24 supported on a wrist portion 23 of the painting robot in a radial direction of the brake disc rotor 1 and, at the same time, adjusting its moving speed and paint ejecting direction, while rotating the brake disc rotor 1 at about 150 to 250 rpm. In FIG. 3, the paint areas are given hatching. Herein, a reference numeral 25 indicates a mist corrector.

To use "O-DE SHINE KS BLACK KM" available from Nippon Paint Co., Ltd. as the water-borne acrylic-denatured epoxy resin paint, the paint is diluted so as to have a viscosity of 20 plus or minus 2 seconds by "NK#2cup" (available from Anest Iwata Corp.).

The paint can be dried by various methods in which air drying is promoted under additional conditions. For example, the brake disc rotor 1 may be heated, before painted, to about 50° C. by the above-mentioned spraying of the alkaline degreasing cleaner at 60 to 75° C., so that the paint is dried by a combination of such heating and air blowing after the coating.

The road wheel mounting plane 6 is machined by turning after formed by casting, as described above. The turning is performed generally under the cutting condition of at about 0.2 to 0.4 mm/rev. in view of machining accuracy and productivity. The machined surface of the road wheel mounting plane 6 has wave-form unevenness with a spiral cut groove (like a record), under the influence of nose radius of a cutting tool.

The thickness t of the rust preventive coating 8 formed on the road wheel mounting plane 6 is measured using a common electromagnetic coating thickness meter (e.g. "SDM-mini" available from Sanko Electronic Laboratory Co., Ltd.), for controlling the coating thickness t to be in a range of 1 to 20 µm. At this time, there arises an error of about plus or minus 4 µm in the measured value of the coating thickness owing to the wave-form unevenness of the machined surface of the road wheel mounting plane 6. Such a measurement error becomes more pronounced as the coating thickness meter attains a higher resolution.

Thus, the thickness t of the rust preventive coating 8 is adjusted to 1 µm or more so that the whole of the machined, uneven road wheel mounting plane 6 is assuredly covered with the rust preventive coating 8 while allowing for the measurement error. Further, the coating thickness t is adjusted to a maximum of 20 µm for the reason described later.

Figure 4:
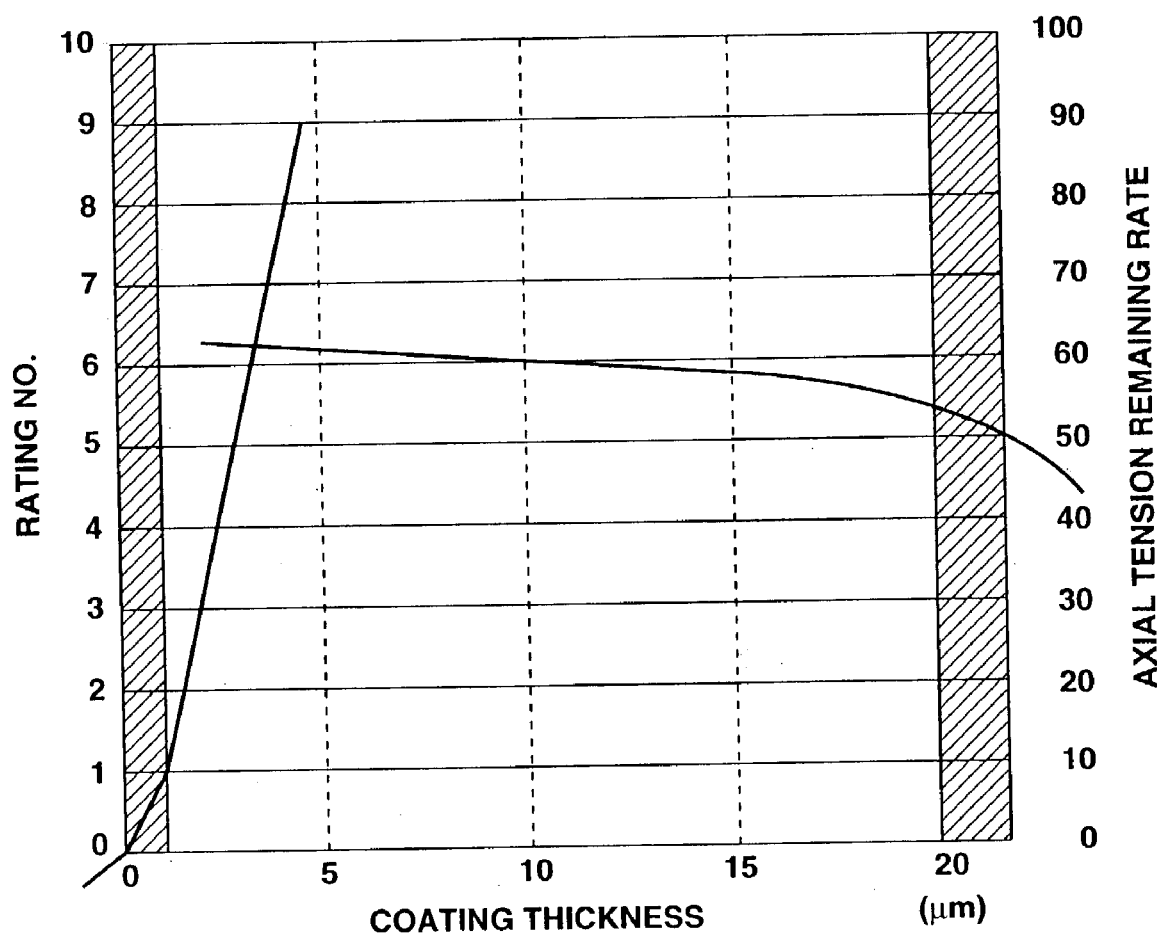
FIG. 4 is a graph showing, in a salt spray test on a road wheel mounting plane covered with a rust preventive coating of paint, a relationship between rust preventive performance and a thickness of the rust preventive coating as well as a relationship between a thickness of the rust preventive coating and an axial tension remaining rate of a wheel nut for fastening a road wheel.

FIG. 4 shows, in a salt spray test on the road wheel mounting plane 6 covered with the rust preventive coating 8, a relationship between rust preventive performance and the thickness t of rust preventive coating 8 as well as a relationship between the thickness t of rust preventive coating 8 and an axial tension remaining rate of the wheel nut for fastening the road wheel.

The rust preventive performance can be evaluated in terms of rating number. A larger rating number means a lower rate of rust formation at a predetermined time after the salt spraying. It is shown that there is almost no rust formation at a predetermined time after the salt spraying when the thickness t of the rust preventive coating 8 is 5 µm or more.

The axial tension remaining rate is determined by measuring an axial tension exerted on the hub bolt at the time the road wheel is fastened to the coated road wheel mounting plane 6 with the application of a predetermined tightening torque via the wheel nuts and an axial tension exerted on the hub bolt at a time predetermined time has elapsed after releasing the tightening torque, and indicates a rate of the axial tension of the hub bolt remaining after the expiration of predetermined time with respect to the initial axial tension. As is apparent from FIG. 4, the axial tension remaining rate dramatically decreases due to the thickness t of the rust preventive coating 8, when the coating thickness t exceeds 20 µm. Thus, the thickness t of the rust preventive coating 8 is adjusted to 20 µm or less.

As mentioned above, the measurement error of plus or minus about 4 µm may be introduced in the course of adjusting the thickness t of the rust preventive coating 8 so as to be in a range from 1 to 20 µm. If the error is introduced on the minus side of the lower limit or on the plus side of the upper limit, the thickness t of the rust preventive coating 8 exceeds the above-mentioned range of 1 to 20 µm.

It is thus preferable that the paint is applied by spray coating in such a manner that the thickness t of the rust preventive coating 8 is controlled to be in a range from 5 to 15 µm, more preferably 10 µm, in consideration of the measurement error of plus or minus about 4 µm.

According to the first embodiment of the present invention, at least the road wheel mounting plane 6 is coated with the above-specified rust preventive paint, i.e. water-borne acrylic-denatured epoxy resin paint. It is thus possible to attain sufficient rust preventive performance for the road wheel mounting plane 6 of the brake disc rotor 1 without causing the loosening of the wheel nuts as well as any adverse effect on substantial braking function. It is also possible to attain, by means of the above thin paint coating alone, a comparable corrosion proofing effect to that of a conventional coating formed by the combination of zinc phosphate conversion treatment and paint application, because the above rust preventive paint is highly resistant to corrosion.

In the paint application of the present invention, masking for non-paint areas is not needed. It is thus possible to enhance yield by reducing paint waste. Further, there is no possibility of secondary problem for the environment through the pollution-free rust proofing process.

Figure 5:
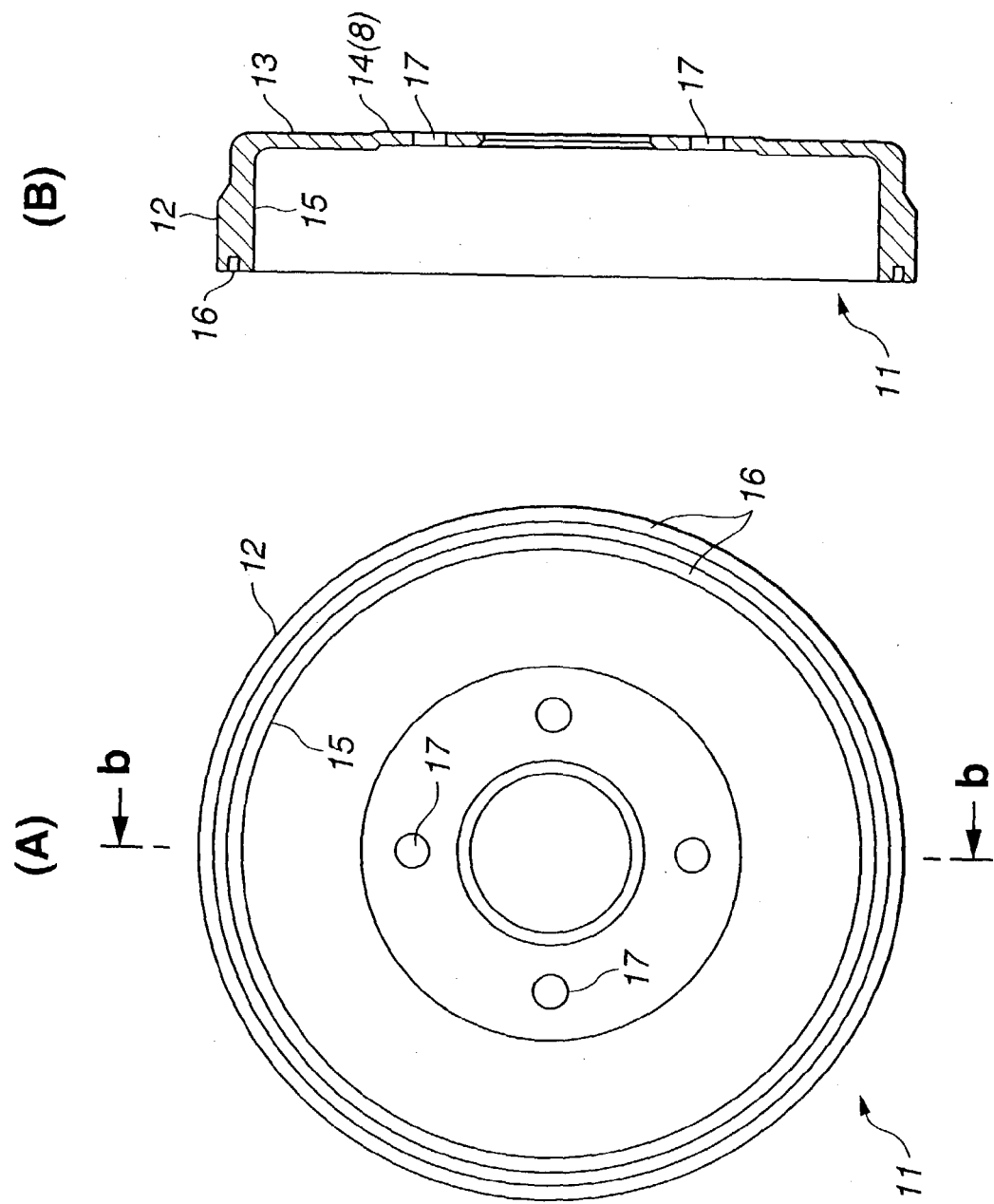
FIG. 5(A) is a front view of a disc brake rotor according to a second embodiment of the present invention.
FIG. 5(B) is a sectional view of the disc brake rotor when taken along a line b—b of FIG. 5(A).

FIG. 5 shows a brake drum of a drum brake to which the present invention is applied according to a second preferred embodiment thereof.

As shown in FIG. 5, the brake drum 11 is formed into a bottomed cylindrical shape, and includes a stepped body portion 12 and a bottom portion 13. A section raised at the center of the bottom portion 13 serves as a road wheel mounting plane 14. A sliding surface 15 on the inner surface of the body portion 12, the road wheel mounting plane 14 and an opening edge 16 are machined after metal casting. Then, the body portion 12 except for the sliding surface 15 and the opening edge 16, i.e., the cylindrical outer surface of the body portion 12 and the bottom portion 13 including the road wheel mounting plane 14 are coated with the same rust preventive paint as used in the first embodiment. Herein, the road wheel mounting plane 14 is formed with a plurality of bolt holes 17 for engagement with hub bolts.

Among the paint areas, at least the road wheel mounting plane 14 is coated with the above rust preventive paint in such a manner that a rust preventive coating 8 has a thickness of 1 to 20 µm, preferably 5 to 15 µm, in the same manner as the above first embodiment.

Accordingly, it is possible to attain the same effect in the second embodiment as in the first embodiment.

The invention claimed is:

1. A rotary braking member for use in a vehicle brake system, being formed into a drum or disc shape and having at least a road wheel mounting plane covered with a single coating composition comprised of water-borne acrylic-denatured epoxy resin paint that contains aluminum zinc phosphomolybdate as a rust preventive pigment, wherein the coating has a dry thickness of 1 to 20 µm.

2. A rotary braking member according to claim 1, wherein the rotary braking member is a brake disc rotor of a disc brake.

3. A rotary braking member according to claim 1, wherein the dry thickness of the coating is from 5 to 15 µm.

4. A rotary braking member according to claim 3, wherein the rotary braking member is a brake disc rotor of a disc brake.

5. A rust proofing process for a rotary braking member as claimed in claim 1, comprising:

washing a braking member;

providing a water-borne acrylic-denatured epoxy resin paint that contains aluminum zinc phosphomolybdate;

adjusting a viscosity of the paint;

after said adjusting, spraying the paint to form a rust preventive coating of the paint on at least a road wheel mounting plane of the braking member; and drying the coating, wherein the coating has a dry thickness of 1 to 20 µm.

6. A rust proofing process according to claim 5, wherein the coating has a dry thickness of 5 to 15 µm.

7. A rust proofing process according to claim 5, wherein the coating is formed in a single spraying step.

8. A rust proofing process according to claim 5, wherein said spraying is performed using a spray gun.

9. A rust proofing process according to claim 5, wherein the braking member comprises a casting, the road wheel mounting plane comprises a surface formed by cutting the casting, and said spraying is accomplished by spraying the paint directly onto the surface.

10. A rust proofing process according to claim 5, wherein said washing includes treating the braking member with a preheated cleaner to heat the braking member, and said drying includes blowing air so that the coating is dried by the air blowing and the heat given from the preheated cleaner to the braking member during said treating.

11. A rust proofing process according to claim 10, wherein the cleaner is an alkaline degreasing cleaner.

12. A rotary braking member for use in a vehicle brake system, being formed into a drum or disc shape and having at least a ferrous metallic road wheel mounting plane covered only with a coating of water-borne acrylic-denatured epoxy resin paint that contains aluminum zinc phosphomolybdate as a rust preventive pigment, wherein the coating has a dry thickness of 1 to 20 µm so that a bolt and a wheel nut do not work loose after being fastened to the road wheel mounting plane and tightened.

* * * * *